United States Patent [19]
Fürstenau et al.

[11] Patent Number: 6,055,080
[45] Date of Patent: Apr. 25, 2000

[54] OPTICAL MICROPHONE

[75] Inventors: Norbert Fürstenau, Braunschweig; Werner Jungbluth, Königslutter, both of Germany

[73] Assignee: Deutsche Forschungsanstalt fur Luft-und Raumfahrt e.V., Bonn, Germany

[21] Appl. No.: 08/870,080

[22] Filed: Jun. 5, 1997

[30] Foreign Application Priority Data

Jun. 13, 1996 [DE] Germany .......................... 196 23 504

[51] Int. Cl.⁷ ............................................. H04B 10/12
[52] U.S. Cl. ................................. 359/151; 381/172
[58] Field of Search ............................ 359/150, 151, 359/172, 180, 182; 385/4; 381/172, 149

[56] References Cited

U.S. PATENT DOCUMENTS

| | | | |
|---|---|---|---|
| 3,622,791 | 11/1971 | Bernard | 359/150 |
| 4,268,116 | 5/1981 | Schmadel et al. | 385/4 |
| 4,344,172 | 8/1982 | Busse | 372/29 |
| 4,412,105 | 10/1983 | Muscatell | 359/151 |
| 4,479,265 | 10/1984 | Muscatell | 359/151 |
| 5,262,884 | 11/1993 | Buchholz | 359/151 |

FOREIGN PATENT DOCUMENTS

| | | |
|---|---|---|
| 0 457 484 B1 | 8/1995 | European Pat. Off. . |
| 61-18300 | 1/1986 | Japan . |
| 4-229817 | 8/1992 | Japan . |

OTHER PUBLICATIONS

Furstenau et al., "Extrinsic Fabry–Perot Interferometer Fiber–Optic Microphone", IEEE Instrumentation and Measurement Technology Conference, Ottawa, Canada, May 19–21, 1997. pp. 603–606.

Furstenau et al., "Entrinsic Fabry–Perot Interferometer Vibration and Acoustic Sensor Systems for Airport Ground Traffic Monitoring", IEE Proc.–Optoelctron. vol. 144, No. 3, Jun. 1997. pp. 134–144.

"Fiber–Optic Microphone using a Fabry–Perot Interferometer" by H. Naono, M. Matsumoto, K. Fujimura, and and K. Hattori in Proc. 9th Int. Conf. on Optical Fiber Sensors (OFS–9), Florence, 1993, pp. 155–158.

*Primary Examiner*—Kinfe-Michael Negash
*Attorney, Agent, or Firm*—Salter & Michaelson

[57] ABSTRACT

In an optical microphone including a light source, a fiber optic cable and a Fabry-Perot interferometer with two reflectors, wherein one end face of the fiber optic cable forms a first reflector and the second reflector is arranged at a distance therefrom and is displaceable by fluctuations in the sound air pressure, the second reflector is the end face of a glass fiber section which is displaceable by induced air pressure by means of a separate diaphragm that is coupled thereto. The light source may be a super luminescent diode (SLD).

14 Claims, 4 Drawing Sheets

OPTICAL MICROPHONE

BACKGROUND OF THE INVENTION

The present invention relates to an optical microphone or transducer including a light source, a fibre optic cable and a Fabry-Perot interferometer equipped with two reflectors, wherein one end face of the fibre optic cable forms a first reflector and the second reflector is arranged at a distance therefrom and is displaceable or deflectable by fluctuations in the sound air pressure.

In many fields of application, it is necessary to arrange the microphone well away from the associated audio amplifiers. The unamplified electrical microphone signals then have to traverse long paths. Cable losses and capacitances as well as stray electromagnetic pick-up in the cable limit the length of the connecting cable to the electronic amplifier. Consequently, if distances in the order of kilometers have to be traversed, for example for traffic monitoring purposes, then the electrical signal is frequently initially digitised and, following an electro-optic conversion, is transmitted as an optical signal over a glass fibre cable to a distant receiver in order to ensure optimum transmission quality. It is a disadvantage here that the electro-optic conversion requires a costly processing of the electrical signal at or near the place where the microphone is situated. Thus, in addition to the optical test signal lead, an electrical current supply is needed at the place where the microphone is situated. The electronic equipment located there is subject to faults and has to be maintained.

Sound induced fluctuations in the air pressure can, however, be directly converted into a phase modulation of a light wave and then into an intensity modulated optical signal by a process of superimposition. An optical microphone of this type can thus transmit the test signal over a glass fibre cable without using an electro-optical conversion process. The optical signal can be amplified and processed at the test analysis location using conventional electronic equipment following an opto-electric conversion process. An optical microphone is thus immune to electromagnetic interference. Furthermore, the problems with earth loops, which occur with electrical installations, especially when long transmission paths are involved, are eliminated.

A microphone of this type has been described by H. Naono, M. Matsumoto, K. Fujimura, K. Hattori in the Proc. 9th Int. Conf. on Optical Fibre Sensors (OFS-9), Florence 1993, pages 155–158 under the title "Fibre-Optic Microphone using a Fabry-Perot interferometer". The optical microphone described therein includes a miniature Fabry-Perot Interferometer as the sensing element. A highly coherent laser diode is used as the light source. The pencil of light emerging from a single-mode glass fibre is reflected by a reflectively coated film diaphragm disposed some 10 $\mu$m to 100 $\mu$m away and then coupled back into the fibre. Sound induced fluctuations in the air pressure cause in-phase alterations of the glass fibre—diaphragm spacing. The correspondingly phase modulated ($\Delta\Phi(L)$, L=Fabry-Perot length), reflected light wave is superimposed on the light wave that is partially reflected at the glass fibre—air interface to form an interference signal (intensity I=2 R (1−cos $\Delta\Phi$), where the specular reflectance R<<1) which is conducted in the form of an acoustic frequency intensity modulated light wave over the glass fibre feeder to a photodetector where an opto-electric conversion process takes place so that processing in a conventional manner can then be effected. By virtue of the interference-free superimposition of the forward and return light waves, the optical microphone only requires just one single-mode glass fibre cable, which is simultaneously used as a "supply-" and as a signal lead, for establishing the connection between the test location and the processing location.

The known construction nevertheless has some disadvantages. The cos characteristic of the interference signal (only at low reflectances R; the cos characteristic changes into an Airy function at higher values of R) can lead to temperature induced signal fading due to the thermal expansion of the Fabry-Perot resonator: the small signal sensitivity (increase of the cos $\Delta\Phi$characteristic) approaches zero at the maximum or minimum of the cos function. For the purposes of stabilising the small signal sensitivity, costly demodulation and stabilising processes, which are known as homodyne and heterodyne processes, are required. In the case of the cited reference, the working point is stabilised by actively de-tuning the wavelength of a DFB laser diode. The use of laser diodes as the highly coherent light sources usually employed for interferometry requires costly temperature and current stabilisation processes as well as an effective method of cutting off the light reflected back by the sensor into the diode thus resulting in correspondingly high costs for the whole system. A further problem arises in the case of the cited arrangement when it is being used outside due to the necessarily very thin (3 $\mu$m) and sensitive foil diaphragm that is required for the sound induced phase modulation process.

SUMMARY OF THE INVENTION

Thus, the object of the invention is to implement an optical microphone which is of simple construction and, at the same time, one which is to a large extent temperature stable.

According to the present invention, there is provided an optical microphone including a light source, a fibre optic cable having end faces, and a Fabry-Perot interferometer, said interferometer having a first and second reflectors wherein one end face of said fibre optic cable forms said first reflector and said second reflector is arranged at a distance therefrom and is displaceable by fluctuations in the sound air pressure, wherein said second reflector is the end face of a glass fibre section, and wherein said glass fibre section is displaceable by induced air pressure by means of a separate diaphragm coupled thereto.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENTS

Figure 1:
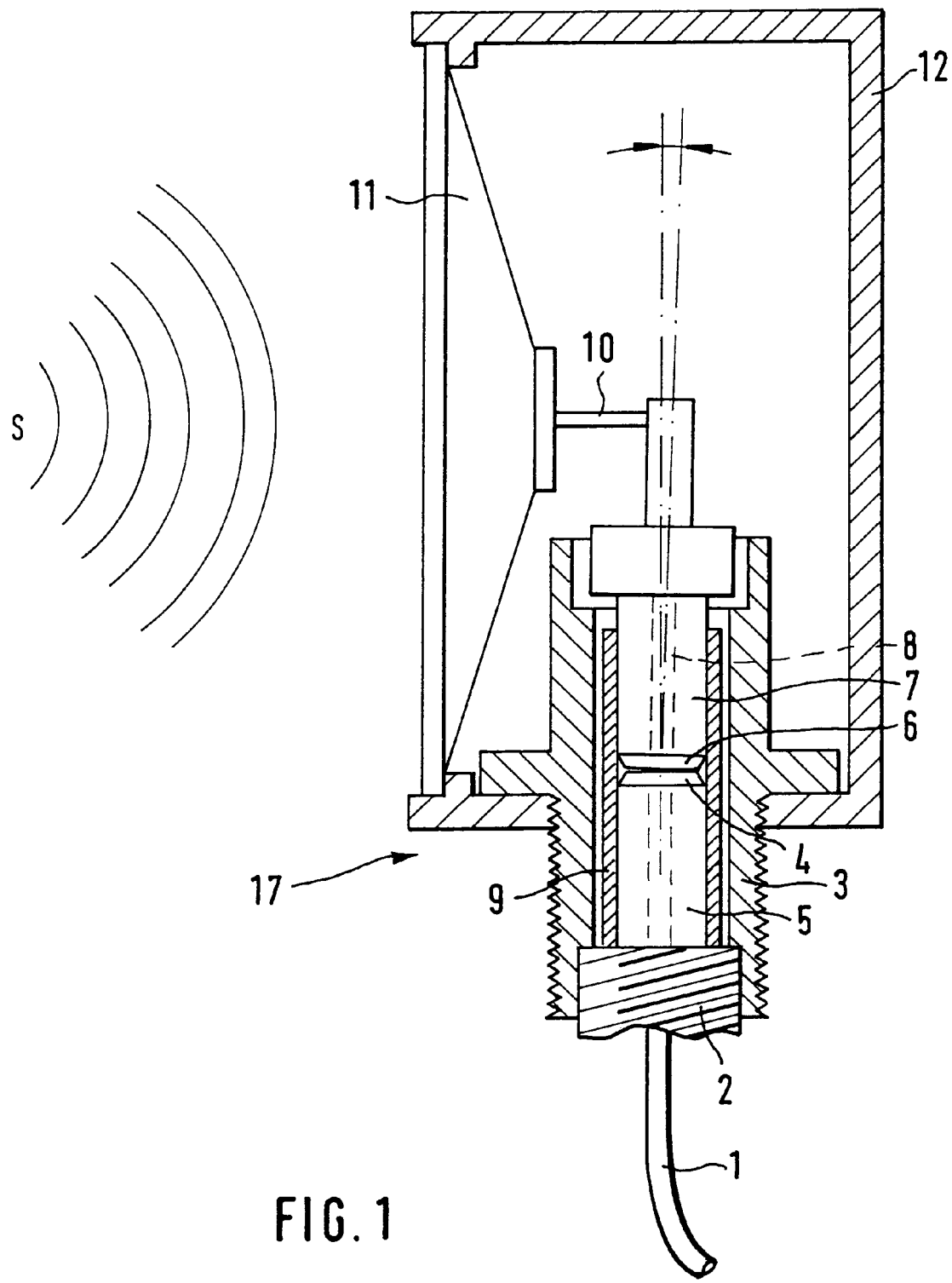
FIG. 1 shows a partial, sectional view of a sensor unit of an optical microphone in accordance with the invention in the form of a first embodiment.

Basically, the present invention provides an optical microphone as set out in the introduction in which the second reflector is the end face of a glass fibre section, whereby the glass fibre section is displaceable or deflectable by induced air pressure by means of a separate diaphragm that is coupled thereto.

Due to the similar construction of the two spaced reflectors in the interferometer as respective end faces of a glass fibre, there is provided a relatively low specular reflectance at the two glass-air interfaces. The setting of the working point of the microphone is thus considerably simplified. Moreover, low coherence and relatively economical light sources can be used for the optical microphone. An optical arrangement for cutting off the light reflected back by the sensor into the diode is not required for light sources of this type. Temperature stabilisation of the working point of the sensor by means of a wavelength de-tuning process is also done away with.

The insensitivity of the device to temperature is further improved by virtue of the spacing (resonator gap) between the two reflectors amounting to 0–20 $\mu$m, whereby the change in length of the separation caused by the displacement amounts to less than 100 nm. Phase noise is reduced by virtue of the extremely small separation of the reflector surfaces i.e. a very small Fabry-Perot resonator length, and very small changes in the separation of the reflector surfaces of just a few nm can be detected. When appropriately adjusted however, this range lies within the linear transmission range of the cos transmission characteristic of the interferometer which leads to an undistorted image signal.

If the end faces of the reflectors are polished and rounded or are broken in the form of a plane surface and they have a reflectance at the glass-air interface of approximately 4%, the setting of the working point of the interferometer is immune to interference. As a result, the intensity modulation of the interference signal may, to a first approximation, be approximated by a cosine function.

By virtue of the end of the fibre facing the reflector being seated in a ferrule and the fibre section being seated in a reflector ferrule within the interferometer, whereby the ferrules are guided by and coaxially surrounded by a hollow, cylindrical connecting element, the reflector end faces of the feeder fibre and of the fibre section are mutually aligned with a high degree of precision. The ferrules preferably consist of a ceramic body having a highly accurate bore for accommodating the fibres. The cylindrically shaped ceramic cores or ferrules are held in collinear alignment by the hollow, cylindrical connecting element. Thereby, however, the reflector ferrule is held so as to be moveable for small displacements or deflections.

The second reflector is thus then the end face of a glass fibre section which is cemented into a high precision ceramic fibre guide (ferrule). The fibre guide is pressed lightly against the guide for the first reflector.

The setting of the working point of the microphone is effected by a very small initial tipping of the touching ferrules holding the glass fibres. If the ferrules holding the end faces of the reflectors are pressed together at a slight angle, the setting of the working point of the interferometer is immune to interference, and in particular, its temperature stability is very high.

The polished reflector fibre end of the second reflector and/or the polished end of the fibre cable, i.e. the first reflector, may be ground at an angle to the fibre axis, preferably at an angle between 80° and 90° in the case of a perpendicular reflector. By rotating the reflector about the fibre axis, the initial spacing (the working point) can thereby be set very precisely.

Since only a low coherence light source is required for the optical microphone in accordance with the invention, an economical super luminescent diode or even a normal light emitting diode can be used as the light source. The light source thereby emits light having a coherence length Lc<50 $\mu$m.

A mechanical coupling conveys the linear, sound induced mechanical movement of the diaphragm to the fibre section held by the reflector ferrule. If the axial movement of the diaphragm is arranged to be perpendicular to the axis of the Fabry-Perot interferometer and the mechanical coupling is formed as an angle piece whereby the connecting element permits the reflector ferrule to tip in a resilient manner, the connecting element functions as a spring element for resiliently displacing the reflector ferrule through the smallest possible angle whereby the reflector ferrule is pressed very lightly against the ferrule holding the fibre cable for the purposes of achieving a highly temperature stable working point. The alteration in the resonator gap resulting therefrom produces a light wave which is phase modulated in correspondence with the displacement.

Alternatively, a collinear alteration in the resonator gap, which likewise leads to a phase modulated light wave, can be produced when the axial movement of the diaphragm is arranged to be collinear with the axis of the Fabry-Perot interferometer and the mechanical coupling is formed as a rod-like extension of the reflector ferrule whereby a resilient spacer, preferably in the form of three adhesive spots on the surface of the ferrule, is arranged between the two ferrules in the resonator gap. The resilient spacer that is to be provided in the resonator gap preferably has a thickness of 10–20 $\mu$m which defines a corresponding mutual rest-spacing of the two reflectors in the interferometer. The spacer is resiliently deformed when there is a sound induced displacement i.e. it is compressed or stretched. The reflector ferrule is preferably pressed by a light force against the ferrule holding the fibre cable in this case too, in order to achieve a high temperature stability for the working point.

The signals from this optical microphone, which is implemented on a glass fibre basis in the form of a Fabry-Perot micro-interferometer, are completely immune to electromagnetic interference and can be read out over glass fibre paths in the kilometer range without any intermediate amplification. The purely optically working, acoustic sensor was developed for use in the traffic field and accordingly was designed to be rugged for external usage. The micro-interferometer principle is well suited to further miniaturisation of the sensor, down into the mm range. Accordingly, the optical microphone can also be employed in many other fields where conventional e.g. condenser microphones are used. Naturally, applications of particular interest are those in which the employment of electrical microphones is problematical due to heavy electromagnetic interference and/or long transmission paths.

Apart from the actual sensor element, the sensor system consists of a super luminescent diode (SLD) as the light source from which the light is fed into the cable-form (single-mode) fibre line to the sensor element via a fibre optic directional coupler. The light coupled back into the fibre line from the sensor is branched off within the coupler to a photo-diode in the second input arm of the coupler so that it can be converted there into an electrical signal for further electronic processing.

The actual sensor element is a fibre optic extrinsic, Fabry-Perot micro-interferometer (EFPI). Translational movements of a diaphragm, which is excited by the acoustic source, are converted into proportional alterations in the length of the Fabry-Perot resonator by appropriate mechanical means. The resonator consists of two plane end faces separated by an air gap (of up to a few 10 micrometers) of single-mode glass fibres having a reflectance of ca 4% which are cemented into precision guides. Using sufficiently coherent light of appropriate wavelength and very low specular reflectances, one can obtain a $\cos^2$ shaped output intensity, which is dependent on the phase or the mirror spacing when there are alterations in the spacing between the ends of the fibre and the mirror, in the form of an interference signal having virtually 100% interference contrast for ca 16% maximum reflectance of the FP in the ideal case. The mirror spacing is set such that the test signal amplitude, which is usually small in proportion to the amplitude of the interference, moves in the linear region of the $\cos^2$ characteristic (quadrature conditions). The housing diameter of 4.5 cm in the prototype envisaged for external use is basically determined by the diaphragm being used; the mechanical construction of the actual micro-interferometer for converting the movement of the diaphragm into phase modulation of the light wave and for producing an interference signal proportional to the incident sound signal has dimensions of 1 cm×5 mm.

The advantages of the optical microphone in accordance with the invention are:

Intrinsic electromagnetic compatibility (no electrical components at the location of the sensor)

No earth loops in the sensor network due to the passive optical sensor arrangement having no electrical components High sensitivity due to the Fabry-Perot micro-interferometer used as the sensor element Large distances between the transmitting/receiving unit and the sensor element are possible (km range)

Interference free superimposition of the go and return light in a single fibre line Use of a single light source for a plurality of sensors due to the employment of fibre optic 1XN directional couplers Further miniaturisation is possible for other fields of application due to the use of the micro-interferometer principle.

Referring now to the drawings, FIG. 1 shows a sensor unit 17 of an optical microphone in accordance with the invention in the form of a first embodiment. The central sensor element of the optical microphone is an extrinsic, Fabry-Perot micro-interferometer (EFPI). The interferometer is constructed from the components of fibre optic single-mode plugs of the FC type (face contact). In the case of so-called FC plugs, the polished, preferably rounded end faces of the two fibre ends that are to be interconnected are pressed against each other in such a way that a glass-air interface, and hence the reflection at this point, is largely suppressed.

In the present embodiment of FIG. 1, an FC plug 2 is arranged on a fibre optic line 1, which is constructed as a single-mode glass fibre cable, at one end of the fibre 1. The FC plug 2 is screwed into an FC adapter 3 such as is usually used to connect two single-mode cables. The single-mode glass fibre cable 1 ends in the FC plug 2 at a polished end face 4 or at an end face that has been broken so as to form a plane. This end of the fibre 1 is cemented into a precision bore in a ceramic core 5, hereinafter also referred to as a ferrule, which accommodates the glass fibre 1. The polished end face 4 of the glass fibre 1 forms a first reflector of the interferometer. The second reflector that is needed to form a Fabry-Perot resonator is formed as the end face 6 of a glass fibre section 8 of the same type as fibre 1, this end face being opposite the end face 4 of the fibre optic line 1. The glass fibre section 8 is likewise cemented into a precision bore in a further ceramic core or reflector ferrule 7.

The two collinearly arranged ferrules 5, 7 are fed into and then seated in a hollow cylindrical connecting or spring element 9. In so doing, the ferrule guide at the reflector ferrule 7 end of the FC adapter 3 is suitably enlarged so that the reflector ferrule 7 is moveable and, in this first embodiment, can be slightly tipped. In order to stabilise the length of the resonator, the ferrule 7 is pressed against the ferrule 5 with a light force.

The FC plug/adapter combination forms the Fabry-Perot interferometer. The FC adapter 3 is screwed into the base of a small housing 12 on the side of which there is fixed a mounting including a diaphragm 11 which converts the air pressure fluctuations of the acoustic signal S into a linear mechanical movement. The diaphragm 11 is constructed in the form of a miniature loudspeaker for example, whereby the moveable centre of the diaphragm is connected to the moveably mounted reflector ferrule 7 and hence, to the second reflector by means of a mechanical coupling 10.

In the first embodiment in accordance with FIG. 1, the axial movement of the diaphragm 11 is arranged to be perpendicular to the axis of the Fabry-Perot interferometer. The mechanical coupling is effected via an angle piece 10 which is fixed at one end to the diaphragm 11 and to the reflector ferrule 7 at the other whereby the sound induced translation of the diaphragm is converted into a tipping movement of the ferrule. An air gap, whose length ΔL (=length of the Fabry-Perot resonator) is altered in correspondence with the fluctuations in the air pressure), occurs between the two opposed fibre end faces 4, 6 acting as reflectors.

Figure 2:
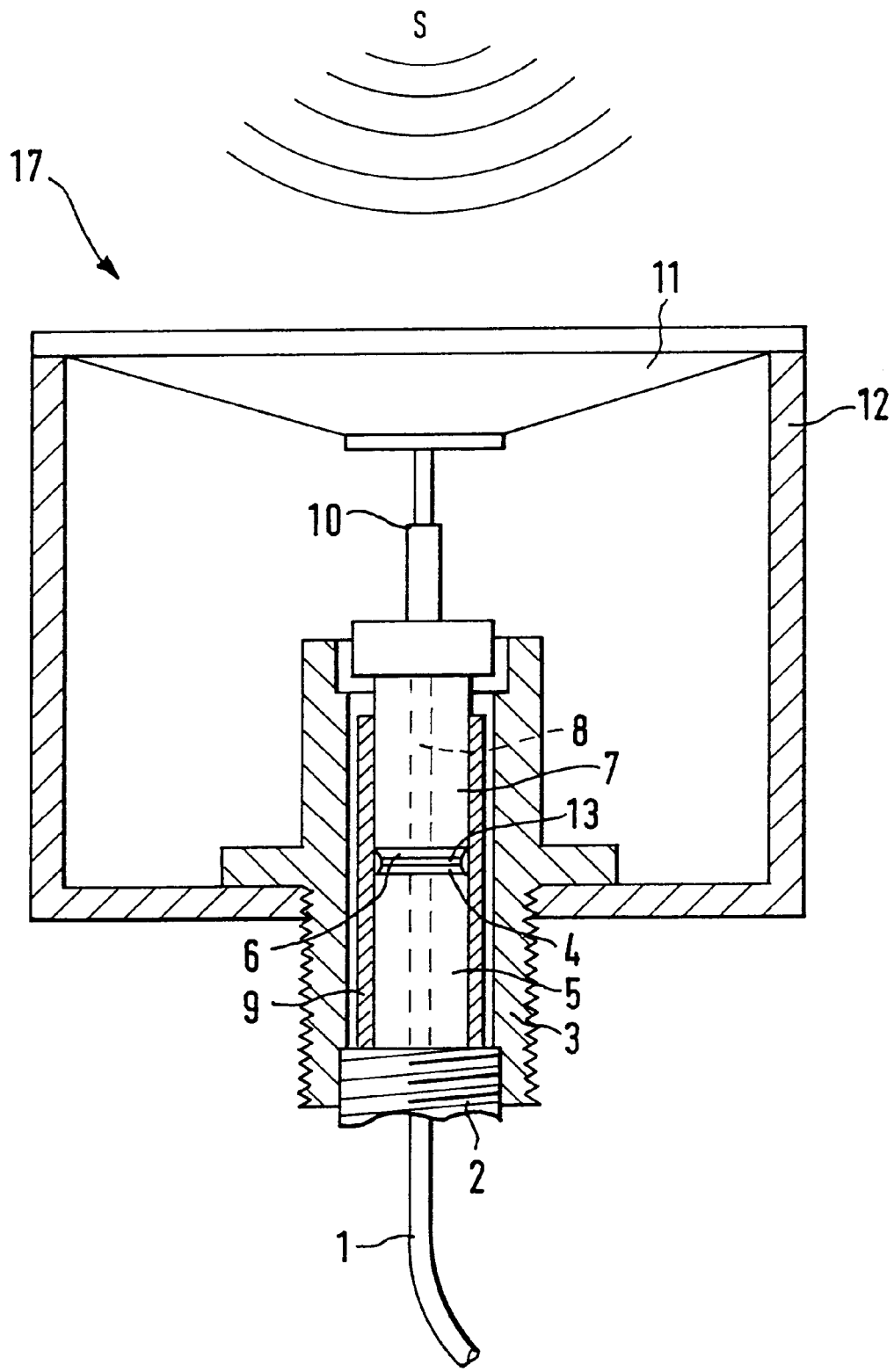
FIG. 2 shows a partial, sectional view of a sensor unit of an optical microphone in accordance with the invention in the form of a second embodiment, FIG. 3 a diagram for illustrating the interference signal in dependence on the length of the Fabry-Perot resonator and FIG. 4 a schematic construction of the optical microphone in accordance with the invention including a light source and a receiving unit.

In the second embodiment of the sensor unit 17 of an optical microphone which is illustrated in FIG. 2, those components having a similar function are provided with the same reference numerals. Here, in contrast to the first embodiment, the diaphragm 11 is installed in the housing 12 for the sensor opposite to the FC adapter 3. The linear mechanical movement arising from an acoustic signal S incident on the diaphragm 11 is conveyed to the reflector ferrule 7 via a mechanical coupling 10 having a rod-like form. The axial movement of the diaphragm 11 is thus arranged to be collinear with the axis of the Fabry-Perot interferometer so that the reflector ferrule 7 moves collinearly relative to the first ferrule 5 in correspondence with the displacement of the diaphragm. In so doing, the reflector ferrule 7 is guided in its movement by the hollow cylindrical connecting element 9 surrounding the two ferrules. The two opposed end faces of the ferrules 5 and 7 are held apart from one another by resilient spacers 13 and are pressed together by a light force for the purposes of temperature stabilisation.

Figure 3:
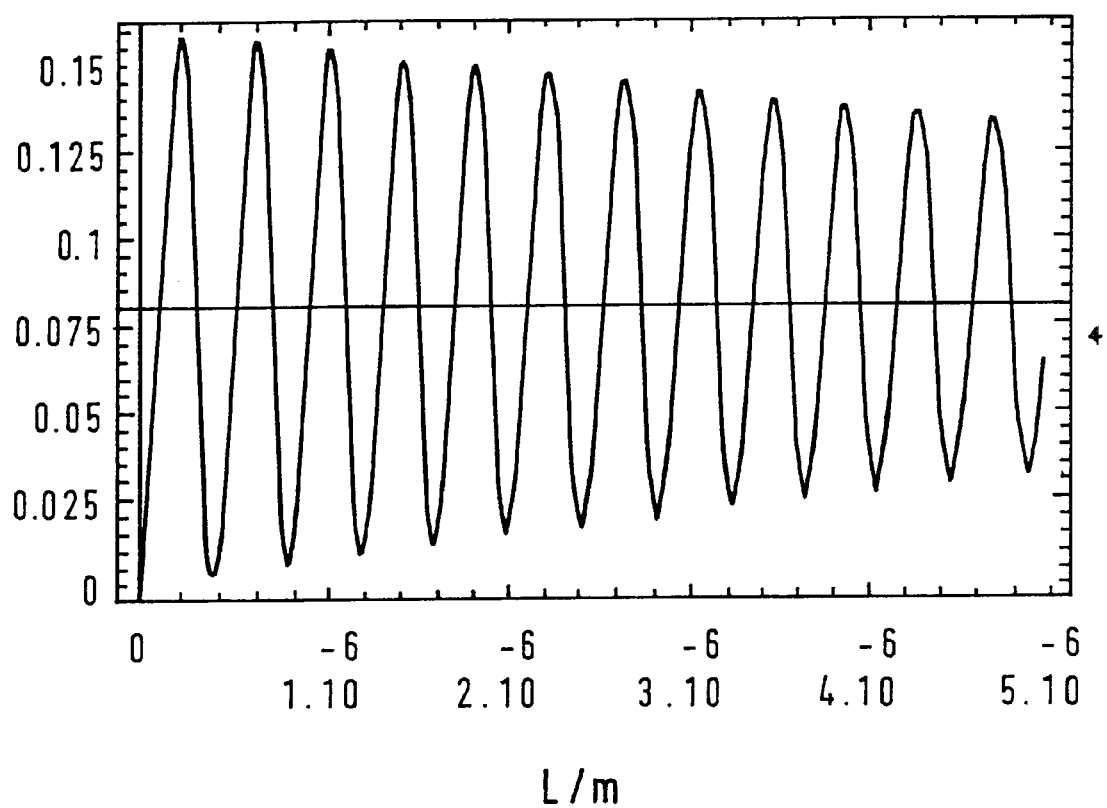

The interference signal of a Fabry-Perot interferometer having low specular reflectance (R=4%) in the case of a light source having a mid-wavelength $\lambda$=820 nm and a spectral half width $\delta\lambda$=20 nm for a mirror spacing L=0 to 5 $\mu$m is illustrated in FIG. 3. The output power normalised against the input light power $i_R = i_R/i_O$ is represented on the abscissa. With a spectral reflectance of 4% (glass-air interface), the maximum relative amplitude of the interference signal amounts to: $iR^{max} = 4R = 16\%$. This maximum modulation of the output signal arises when there is a phase change $\Delta\Phi = 4\pi L/\lambda = \pi$, corresponding to a change in spacing of the reflector surfaces of $\Delta L = \lambda/4 = 0.205$ $\mu$m insofar as L=0 $\mu$m. The interference signal is shown in Diagram 3 for typical values (L=0–5 µm, R=4%, λ=820 nm, δλ=20 nm). The interference contrast constantly falls due to the finite coherence length $Lc=\lambda^2/\delta\lambda$.

Figure 4:
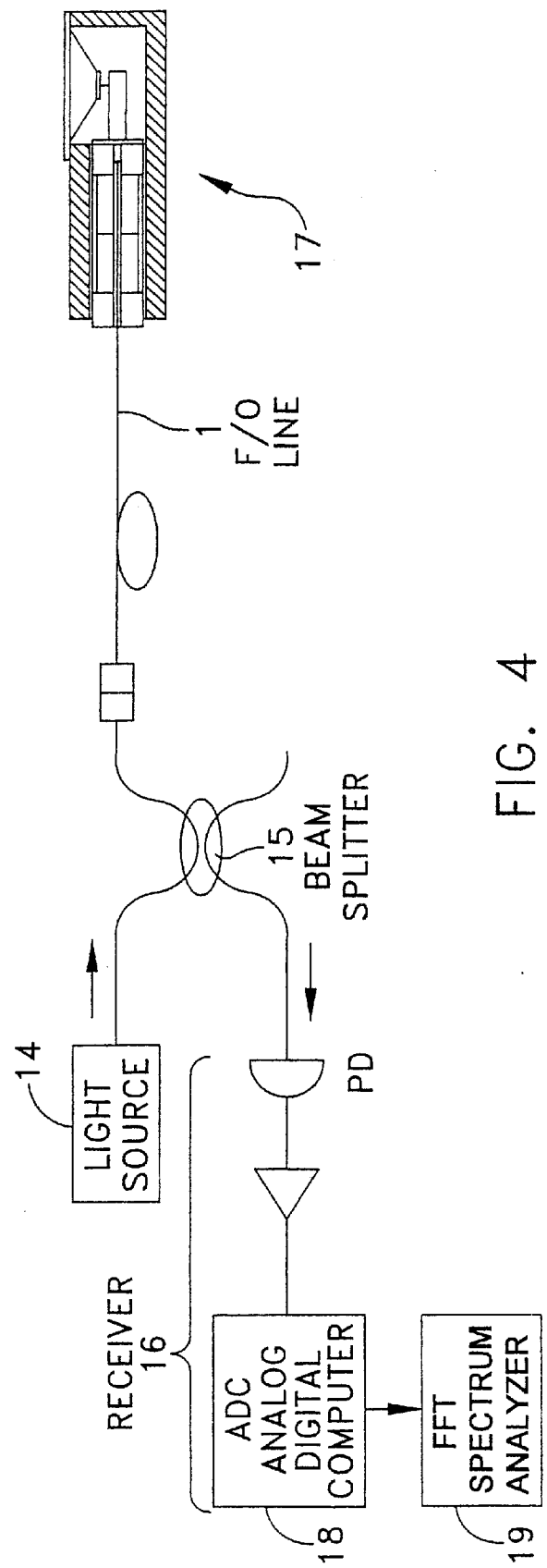

The overall construction of an optical microphone in accordance with the invention is schematically illustrated in FIG. 4. The optical microphone has a light source 14. The light source 14 is preferably a low coherence super luminescent diode (SLD) or a normal light emitting diode (LED) having a fibre "pigtail" coupled thereto. The light wave from the light emitting diode 14 is steered towards a fibre optic beam splitter 15 from which the fibre optic line 1 leads to the sensor unit 17 that has already been described. The light, which is reflected back from the sensor unit 17 and is modulated by interference in the Fabry-Perot resonator, is extended via the fibre optic beam splitter 15 to a receiving unit 16 which has an opto-electric converter, a photo-diode (PD) for example, an amplifier and devices for further processing of the signal. For example, the analogue electrical signal emitted by the amplifier may be applied to an analogue digital converter ADC 18 and be analysed thereafter using an FFT spectrum analyser 19. Thus, in the field of traffic monitoring for example, the classification of vehicles can be undertaken with the aid of characteristic spectra.

The manner in which the optical microphone in accordance with the invention functions will be explained hereinafter.

The low coherence light, which is emitted from the light source 14 that is preferably in the form of a super luminescent light emitting diode, is guided via the beam splitter 15 and the single-mode glass fibre 1 to the sensor unit 17. In the sensor unit 17, the incident light wave is initially reflected at the end face 4 of the single-mode glass fibre cable 1. The major portion of the light wave is conveyed via the resonator air gap to the second reflector 6. The incident light wave is reflected there, whereby a change in the spacing of the resonator gap is caused as a result of any sound induced displacement of the reflector ferrule 7 and the glass fibre section 8 held therein and hence the light wave reflected at the second reflector is periodically phase modulated.

After being superimposed on the light wave reflected at the end of the fibre line 1, this phase change δΦ produces an interference signal which, to a first approximation for a Fabry-Perot interferometer with reflections at similar mirrors having low R, is approximated by $$i_R = 2R(1-\mu(\lambda)\cos(4\pi L/\lambda)), \quad (1)$$

wherein
the function $\mu(\lambda)$ defines the interference contrast which is affected by the spectral width of the light source, here for the example of the spectral function of a damped harmonic resonator:

$$\mu(\lambda)=\exp\{-4\pi L\delta\lambda/\lambda\lambda\}, \text{ and} \quad (2)$$

iR is the output power normalised with respect to the input light power $i_R = I_R/I_O$.

Due to mechanical biasing, the working point is stabilised in the linear region of an interference band, corresponding to one edge of the function illustrated in FIG. 3. In the case of the first embodiment, the rest-angle between the axis of symmetry of the plug adapter and the axis of the reflector ferrule, with a corresponding rest-spacing Lo of the resonator gap, is set such that the interference signal is located approximately at the quadrature point $[\Delta\Phi=4\pi L/\lambda \approx (2N+1)\pi/2; N=0,1,2]$ which, as the working point in the centre of an interference signal amplitude, represents the most sensitive region for small signals. By differentiating (1), with $\Delta\Phi=\pi/2$, one obtains $$di_R/dL = 8R\pi/\lambda \quad (3)$$

as the sensitivity with respect to the changes in spacing δL.

For λ=0.82 µm and R=4%, there results $diR/dL\approx1.2\,\mu m^{-1}$. The sound induced phase changes δΦ (and the corresponding path changes δL) have to be small in comparison with ΔΦ=π over the sound pressure range (dynamic range) to be transmitted because of the cos transmission characteristic. The requirement $$\delta i_R << 4R$$

follows from what has been said above.

If, for example, we select $\delta i_R=0.1$ (4R), then the corresponding change in path resulting from (3) is δL≈20 nm. The tipping angle of the reflector moved by the diaphragm for a ferrule radius a=2.5 mm turns out to be δΘ=δL/a=8 µrad, corresponding to $5*10^{-4}$ grad. Equation 3 is no longer valid for larger values of R, when the glass fibre surfaces are additionally mirrored, since the complete Airy function then has to be drawn upon for characterising the Fabry-Perot interference signal instead of (1). The sensitivity can then be increased at will with the increasing Q factor of the resonator, but the setting of the working point becomes progressively more difficult.

For the purposes of a theoretical estimate, the sensitivity to sound induced air pressure fluctuations, or the dynamic range, requires (2) to be multiplied by further factors:

$$\frac{Di_R}{dp_a} = \frac{di_R}{dL}\frac{dL}{d\Theta}\frac{d\Theta}{dw_a}\frac{dw_a}{dp_a} = \frac{8\pi Ra}{\lambda}\frac{d\Theta}{dp_a} \quad (4)$$

The first factor on the right hand side of the equation (4) specifies the tipping angle sensitivity (embodiment 1) for the relative change in the interference signal (intensity) (3/mrad=18.75 (4R)/mrad); the second factor defines the change in tipping angle with sound pressure which is dependent on the design of the mechanical construction for converting the movement of the diaphragm into tipping of the reflector ferrule. $dw_a/dp_a$ is the linear translation $w_a$ of the diaphragm caused by the sound pressure $p_a$.

The dependency of the change in intensity $di_R/dp_a$ upon pressure in embodiment 2 results from multiplying equation (3) by $dL/dp_a$. This factor is again determined by the resilient properties and the damping factor of the mechanical system.

It will be understood that the above description of the present invention is susceptible to various modifications, changes and adaptations.

List of Reference Symbols 1 fibre optic line (single-mode glass fibre cable)
2 FC plug
3 FC adapter
4 first polished end face, first reflector
5 first ceramic core or ferrule
6 second polished end face, second reflector
7 second ceramic core or reflector ferrule
8 glass fibre section
9 connecting or spring element
10 mechanical coupling, angle piece or rod-like element
11 diaphragm
12 housing
13 spacer (resilient)

14 light source
15 fibre optic beam splitter
16 receiving unit
17 sensor unit

What is claimed is:

1. An optical microphone including a light source, a fibre optic cable having end faces, and a Fabry-Perot interferometer, said interferometer having a first and second reflectors wherein one end face of said fibre optic cable forms said first reflector and said second reflector is arranged at a distance therefrom and is displaceable by fluctuations in the sound air pressure, wherein said second reflector is the end face of a glass fibre section, and wherein said glass fibre section is displaceable by induced air pressure by means of a separate diaphragm coupled thereto.

2. An optical microphone in accordance with claim 1, and further comprising a reflector fiber guide for guiding said glass fiber section, and a cable fiber guide for guiding said fiber optic cable, said reflector fiber guide being pressed against said cable fiber guide by a small biasing force.

3. An optical microphone in accordance with claim 1, wherein a spacing forming a resonator gap between said first and second reflectors amounts to 0–20 $\mu$m whereby the change in length of said spacing caused by the displacement amounts to less than 100 nm.

4. An optical microphone in accordance with claim 1, wherein said end faces of the reflectors are polished and have a reflectance of approximately 4% at the glass-air interfaces.

5. An optical microphone in accordance with claim 1, wherein within said interferometer, the end of the fibre facing said first reflector is seated in a ferrule and said fibre section is seated in a reflector ferrule whereby said ferrules are guided by and coaxially surrounded by a hollow, cylindrical connecting element.

6. An optical microphone in accordance with claim 5, wherein a mechanical coupling is provided between said diaphragm and said reflector ferrule holding the fibre section.

7. An optical microphone in accordance with claim 6, wherein axial movement of the diaphragm is arranged to be perpendicular to the axis of said Fabry-Perot interferometer and said mechanical coupling is formed as an angle piece, whereby said connecting element permits said reflector ferrule to tip in a resilient manner.

8. An optical microphone in accordance with claim 6, wherein axial movement of the diaphragm is arranged to be collinear with the axis of said Fabry-Perot interferometer and said mechanical coupling is formed as a rod-like extension of said reflector ferrule whereby a resilient spacer is arranged between the two ferrules.

9. An optical microphone in accordance with claim 8, wherein said spacer has a thickness of 10–20 $\mu$m.

10. An optical microphone in accordance with claim 9, wherein said spacer is formed by the application of adhesive spots.

11. An optical microphone in accordance with claim 1, wherein said light source is a super luminescent diode (SLD).

12. An optical microphone in accordance with claim 1, wherein said light source is a normal light emitting diode (LED).

13. An optical microphone in accordance with claim 1, wherein the ends of the fibres of said first and/or second reflector are ground at an angle to the axis of the fibre.

14. An optical microphone in accordance with claim 13, wherein said angle lies between 80° and 90° in the case of a perpendicular reflector.

* * * * *